Dec. 17, 1929.  G. H. JOHANSON  1,739,903
AUTOMATIC TEMPERATURE CONTROL APPARATUS
Filed Aug. 25, 1925   2 Sheets-Sheet 2

Inventor
Gustav H. Johanson
By his Attorney
Ivan E. O. Konigsberg

Patented Dec. 17, 1929

1,739,903

UNITED STATES PATENT OFFICE

GUSTAV H. JOHANSON, OF PHILADELPHIA, PENNSYLVANIA

AUTOMATIC TEMPERATURE-CONTROL APPARATUS

Application filed August 25, 1925. Serial No. 52,449.

The object of this invention is to provide an automatic temperature controlling device of a generally improved character, whereby the valves regulating the fuel supply to furnaces, may be operated quickly, accurately and in response to variations in the temperature within the furnace to which the device is applied and with particular regard to the element of time which necessarily is a factor to be reckoned with whenever the valves are operated.

It is a further object of the invention to provide means for operating the valves in any one of an indefinite number of positions, as distinguished from operation from a definite open to a definite closed position and vice versa.

It is a further particular object of the invention to provide means for regulating the time intervals between operations of the valves in both directions in response to temperature changes within the furnace caused by a previous valve operation.

The invention and its several objects will be more fully understood from the following specification taken in connection with the accompanying drawings in which—

In the several views details have been omitted and parts broken away for the sake of simplicity and clearness of illustration.

Figure 1:
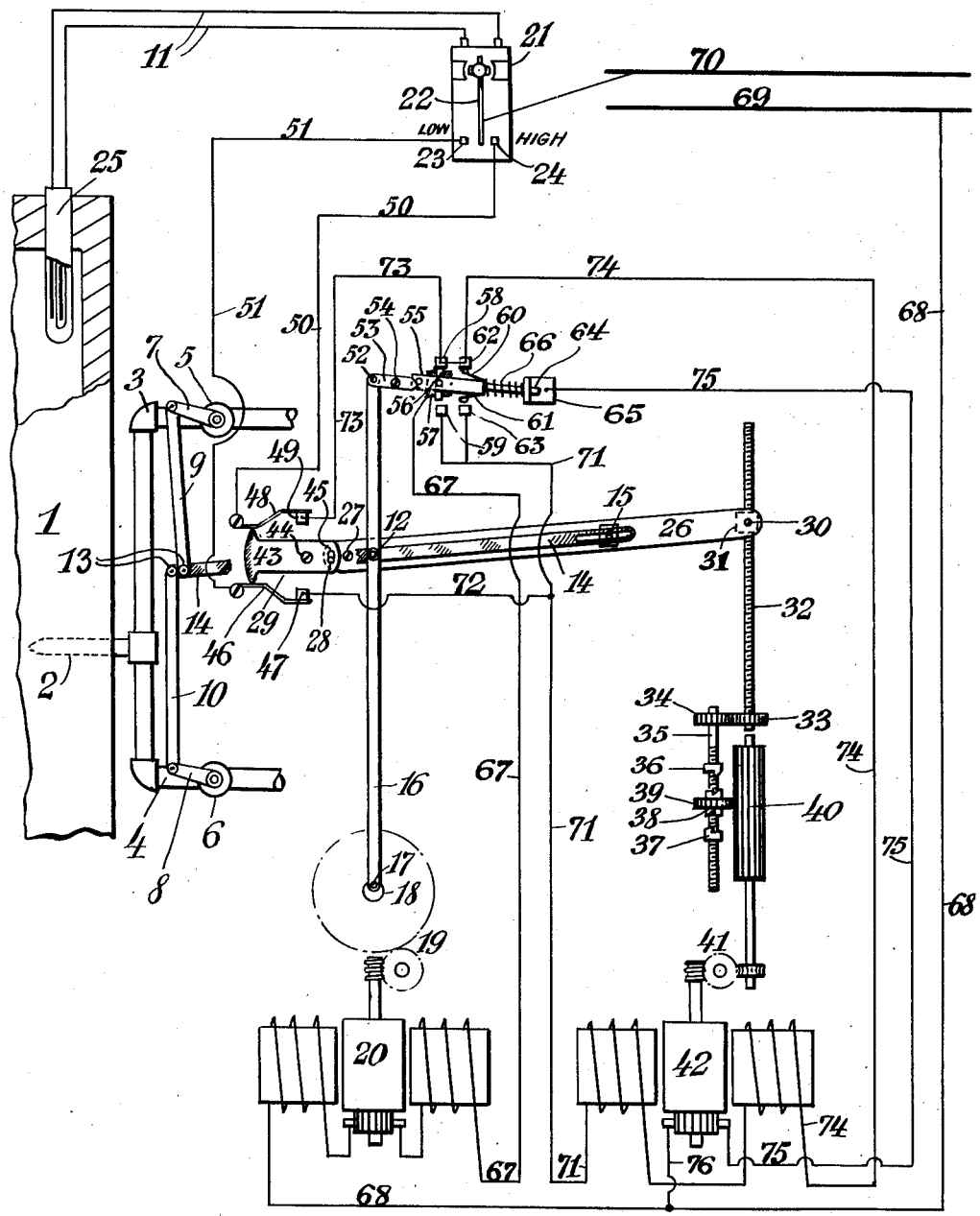
Figure 1 is a diagram illustrating an automatic temperature controlling device embodying the invention.

Referring to Figure 1 the reference numeral 1 denotes a furnace of any suitable construction having a burner 2 which is supplied with fuel through the two supply pipes 3 and 4, of which one supplies air and the other oil, for instance.

The pipes have control valves 5 and 6 respectively adapted to be operated by arms 7 and 8 which are connected by operating links 9 and 10 to a lever 14 which is adapted to oscillate or swing around a floating pivot 15.

The lever 14 is operated by a main link 16 pivoted at 17 to a crank disk 18 operated through suitable reducing gearing 19 from an electric one-way motor 20. The link 16 is pivoted to lever 14 at 12.

The numeral 21 indicates diagrammatically a millivoltmeter or like temperature indicating device in which an element 22 is movable between two contacts 23 and 24 in response to temperature changes in the furnace 1. 23 is the low temperature contact and 24 is the high temperature contact.

The element 22 is operated by a temperature measuring device, as, for instance, a thermocouple 25 of the Le Chatelier type by way of illustration. Wires 11 connect the measuring and the indicating devices.

The floating pivot 15 aforesaid is carried by a main link adjustment 26 which is pivoted adjacent its one end at 27. The shorter, left, end of the adjustment 26 carries a pin 28 for operating a limit switch 29, and the longer, right, end of the adjustment 26 is pivoted at 30 to an adjustable pivot 31 operated by an endless screw 32. To the latter is affixed a gear 33 which meshes with another gear 34 on a screw shaft 35 which carries a closing clutch member 36 and an opening clutch member 37, both of which are adapted to be engaged by a movable clutch member 36 affixed to a gear 39 which meshes with a gear 40 driven by suitable reducing gearing 41 from a reversible motor 42.

The movable clutch member 38 travels on the screw shaft 35 and rotates said shaft by engaging either the member 36 or 37. The mechanical details of these parts as well as of other parts referred to in connection with Figure 1 will be explained later in connection with Figure 2.

The limit switch 29 aforesaid comprises a switch lever 43 pivoted at 44 and provided with a slot 45 engaged by the pin 28 aforesaid in the adjustment 26. The switch lever is adapted, when thrown, to open the contacts 46—47 and 48—49 in the switch.

The movable switch contact 48 is connected by a wire 50 to the high contact 24 in the millivoltmeter, and movable switch contact 46 is similarly connected by a wire 51 to the low contact 23.

The main link 16 aforesaid is connected at its free end at 52 to an arm 53 pivoted at 54 and adapted to operate a snap switch comprising a nonconducting switch lever 55 which carries a contact 56 in constant sliding contact engagement with a fixed contact 57. The contact 56 is also adapted to make contacts to either side with the fixed contacts 58 and 59. The switch lever carries conducting spring contacts 60 and 61 adapted to make contacts with two other fixed contacts 62 and 63.

The stem 64 of the switch lever 55 slides in a contact 65. A conducting spring 66 keeps the switch lever 55 in mechanical operating contact with the operating arm 53 aforesaid, and said spring also serves as a conductor for electric current between the spring contacts 60 and 61, and the fixed contacts 65.

The fixed switch contact 57 below the lever 55 is connected by a wire 67 to the motor 20 and the other side of the motor is connected by wire 68 to the one line wire 69. The other line wire 70 is connected to the contact or movable element 22 in the millivoltmeter. The two fixed switch contacts (to the one side of the snap switch) 59 and 63 are connected together and to the field of the motor 42 by a wire 71. From the latter a wire 72 leads to the limit switch fixed contact 47.

The other limit switch fixed contact 49 is connected by a wire 73 to the snap switch contact 58. The latter is connected to its adjacent contact 62 from which a wire 74 leads to the motor 42. The snap switch contact 65 is connected to the one side of the armature of motor 42 by a wire 75. The other side of this armature is connected to wire 68 by a wire 76.

The operation is as follows: So long as the temperature remains constant at the desired temperature in the furnace, the movable contact or pointer 22 of the device 21 remains in neutral position as shown in full lines in the drawing between contacts 23 and 24 and no current flows through the apparatus.

If the temperature increases, member 22 will move to contact 24 in response to the temperature change. The electric current will then pass from line wire 70 through 22 to 24, wire 50, contacts 48 and 49, and wire 73 to contact 58 where it divides, part of the current passing to contacts 62, 60 and through conducting spring 66 to contact 65, to wire 75 to the armature of motor 42 to wires 76 and 68, to line 69, without, however, causing this motor to operate as no current flows through its field.

From the contact 58 the other part of the current flows to contacts 56 and 57, thence by wire 67 to motor 20 and out by wire 68 to line 69, causing the motor 20 to operate.

Through the gearing 19, crank disk 18 and pivot 17, the main link 16 is moved half a revolution of the crank disk, at which time the link 16 has also moved arm 53 to cause snap switch lever 55 to be snapped downward and break the circuit for motor 20 at the contacts 58 and 56 and the motor 20 will stop, and leaving arm 53 and snap switch lever 55 in opposite positions to those shown in Figure 1 as will be understood.

The movement of link 16 has also moved pivot 12 and through lever 14, links 9 and 10, and arms 7 and 8, the valves 5 and 6 have been closed a definite amount predetermined by the position of the floating pivot 15, which is the center around which lever 14 moves.

If this partial closing of the valves does not result in reducing the temperature in a reasonable short time, which time element in each case depends upon the local conditions, it is obvious that a further closing of the valves is required. This is accomplished through the operation of the motor 42, whose field is now in the circuit due to the changed position of the snap switch lever, the current now flowing as follows:

From 70, through 22—24—50—48—49—73—58—62 to wire 74, thence through the field of motor 42 to contacts 63 and 59. From 59 part of the current will pass to 56 and 57 and through wire 67 to motor 20 and out. But this current is in actual practise so weak, because it first passes through the field of motor 42, that said current does not start motor 20.

The circuit is further completed as follows: from 63 to 61—66—65 and wire 75 through the armature of motor 42, wire 76 and out, and consequently motor 42 starts. One of two things will now happen. If contact 22 remains on high contact 24, the movable clutch member 38 will be moved along the screw shaft 35 through the instrumentality of motor 42, gearing 41, gears 40 and 39, and said clutch member will engage closing clutch member 36 and drive shaft 32 through gears 34 and 33.

The operation of shaft 32 will cause pivot 31 to be moved to swing adjustment 26 upwards (on the drawing) around its pivot 27. Consequently floating pivot 15 will be likewise moved upwards, swinging lever 14 around pivot 12 and as a result the valves will be still further closed.

If now the temperature drops, the member 22 will leave contact 24 and the circuit will be broken.

If for any reason the temperature should again rise the circuit will again be closed at 22—24 and the motor 42 will start, the current passing from 24 to wire 75 for the field circuit and from 61 to wire 76 for the armature described and immediately operate pivot 30 and adjustment 26 to operate the lever 14 to further close the valve, it being remembered that when motor 42 starts this second time, clutch member 38 and 36 are already engaged.

This operation may be repeated until the valves are entirely closed, at which time the adjustment 26 has been moved so far on its pivot 27 that its pin 28 abuts the end of the slot 45 and operates limit switch lever 43 to break the circuit at 48 and 49. This prevents further operation of the valves until the temperature drops below normal, it being remembered that snap switch lever 55 still maintains contacts at 59 and 63.

The other of the two things referred to which might happen, would be that the temperature drops quickly and the circuit is broken at 22—24 before clutch member 38 has reached clutch member 36. In this case, of course, the operation of closing the valves has been sufficient and the motor 42 does not cause any movement of adjustment 26 and no further movement of the lever 14.

If now the temperature drops, element 22 will move to contact 23 and the circuit will then be formed as follows: from 70 to 22—23—51—46—47 and wire 72 to 59 and 63. From 63 the current passes through the armature of motor 42 by way of elements 61—66—65 and 75, but as above explained, the motor 42 does not start. From 59 the current passes to 56—57—67 to motor 20 and out, starting said motor, which through the elements set forth above will cause the valves to be opened a definite amount depending upon the position of the floating pivot 15, and of course moves the arm 53 and snap switch lever 55 back into the positions shown, thus breaking the circuit at 59 and 56 and stopping motor 20.

It will be noted here, that the opening movement of the valves takes places of course from whatever position they were left in by the preceding closing operation.

Should the temperature now within the predetermined time go back to normal, then member 22 goes back to its central position, breaks the circuit at the low contact 23 and no further movement takes, but during this interval, (between the opening operation of motor 20 and until the breaking of the circuit at 23) the current will flow as follows: from 70 to 22—23—51—46—47—72—71 and through the field of motor 42 but in the reverse direction to that described above. Thence further through 74—62—60—66—65 and 75 through the armature of the motor 42 in the same direction as before.

Consequently motor 42 will start rotating, but in the reverse direction and consequently clutch member 38 will be disengaged from closing clutch member 36 and start to travel towards opening clutch member 37. If the circuit is broken at 23 as aforesaid, the motor 42 will stop and no further movement will occur.

If the temperature, however, continues to drop, then the motor 42 will continue to run and clutch member 38 will engage clutch member 37, the shaft 32 will be rotated in the reverse direction and the pivot 30 will be moved downward (in the drawing) to swing adjustment 26 downward with the floating pivot 15, and the movement of the latter will swing lever 14 around pivot 12 and still further open the valves until the drop in the temperature has been compensated for and the circuit broken.

If the temperature again drops, motor 42 will start to operate at once, current passing to it from 70 to 22—23—51—46—47—72—71 the motor field 74 and through the snap switch to the armature of motor 42. Consequently the shaft 32 will also commence operating and through the elements 30, 26, 15 and 14 the valves will be further opened.

When the valves have reached full open position, the movement of adjustment 26 will have caused the pin 28 to abut the other end of the slot 45 to operate limit switch lever 43 to break the circuit at 48 and 49.

Thus it will be seen that if the temperature changes sufficiently to influence the element 22 one way or another, the motor 20 will operate to either open or close the valves a definite minimum amount in between full open and full closed position as determined by the position of the floating pivot 15. The parts are so adjusted and proportioned that the first movement of the valve by means of the motor 20 is a quick initial movement adjusted to suit local conditions by turning the screw shaft 92. This adjustment should in practice be such that the first movement of the valve under normal operating conditions will be sufficient to maintain the desired temperature.

If, however, this small movement of the valves either way does not effect the required increase or decrease in the temperature, then the motor 42 will automatically cause a still further movement, either way as the case may be, to such a point or position that the following initial movement of motor 20 again controls the valves within the required limits.

Again, it will be seen, that a time element is introduced by means of the clutch mechanism 36, 37 and 38 in that if the temperature changes before the member 38 reaches either 36 or 37, no additional movement of the valves takes place. In other words by adjusting the distance between the member 36 and 37 the operator is able to control the time within which any additional operation of the valves shall occur.

Figures 2, 3:
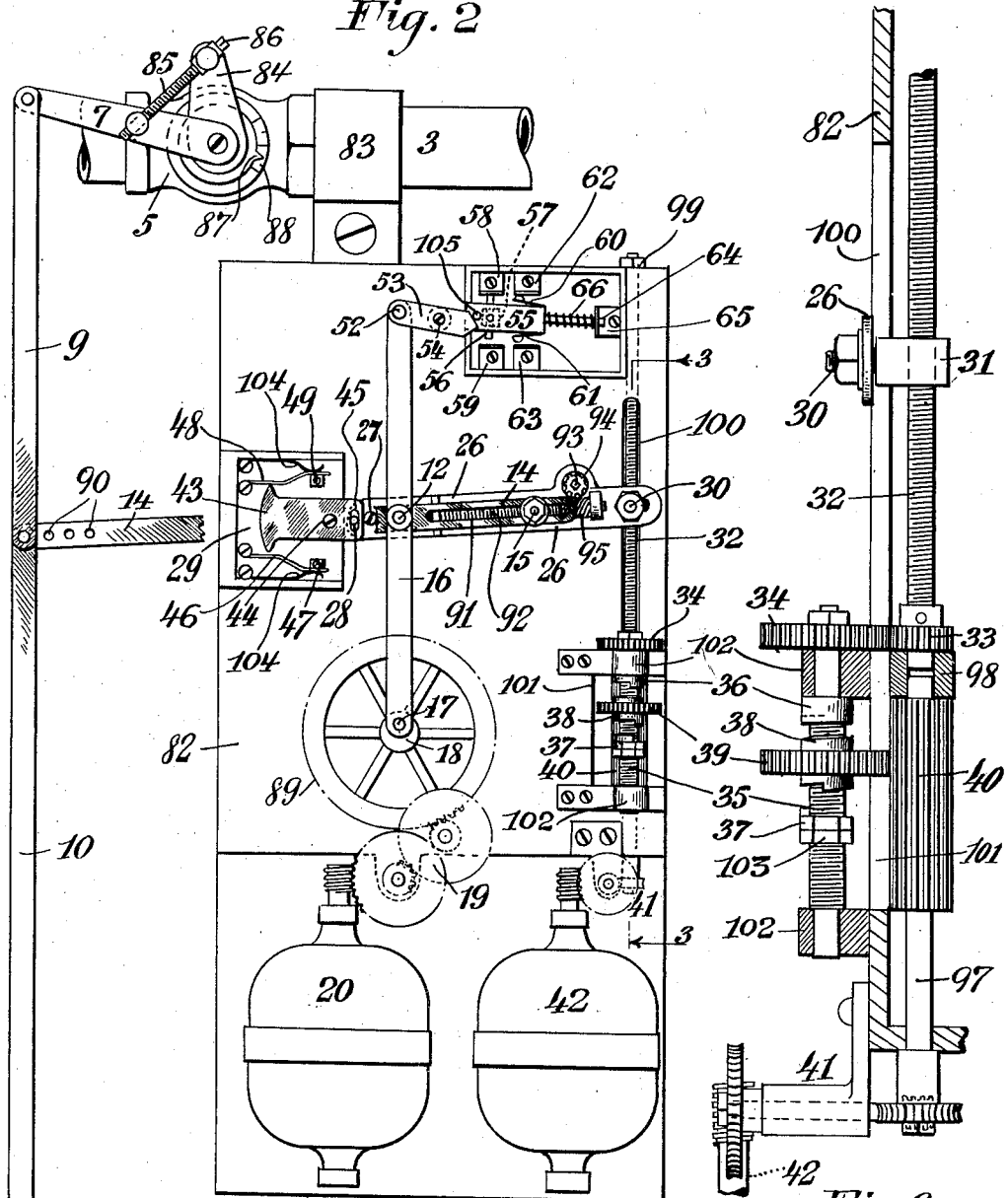
Figure 2 is a view in elevation of the device itself.
Figure 3 is a detail sectional view on line 3—3 of Figure 2.

It now remains to describe the mechanical construction of the device as illustrated in Figures 2 and 3.

As it is one of the objects of this invention to provide a generally improved device, the several parts and submechanisms may preferably be assembled and mounted on a single base 82 to which the supply pipes 3 and 4 may be secured by straps as 83, said pipes 3 and 4 to be suitably connected to the supply pipes in the plant and to the furnace burner as local conditions may require.

The valves 5 and 6 may be adjusted by interposing levers 84, 84 between the valves proper and their operating arms 7 and 8, and connecting said levers to the said arms by swiveled threaded bolts 85, 85 whereby the angle between the levers and arms may be adjusted by applying a wrench to the square heads 16 of the bolts. In this manner the position of the valves within the valve casing may be adjusted with reference to their operating arms. A pointer 87 on the valve stem and a scale 88 on the valve casing furnish the visible means assisting in proper adjustment.

The gearing 19 for driving the crank disk 18 from the motor 20 may comprise a plurality of suitably mounted gears, grouped under the general reference numeral 19, for transmitting the power to a large gear 89 secured to the said crank disk.

The lever 14 for operating the valve connecting links 9 and 10 is provided with apertures 90 for adjustment of the link pivots 13. The other end of the lever 14 has a slot 91 in which the floating pivot 15 is adjustably mounted as follows.

The adjustment 26 carries an adjusting screw 92 upon which the pivot 15 is adapted to travel while moving in the slot 91. By applying a wrench to the stem 93 of a gear 94 which meshes with another gear 95 fast on said screw 91, the latter is rotated to adjust the pivot 15 as will be understood and maintains said pivot in adjusted position. The links 9 and 10 are shown in adjusted pisition in Figure 1 to clearly bring out the flexibility of the construction.

The specific construction of the clutch mechanism for interposing the element of time in the second, or additional, operation of the valves, is best seen in Figure 3. The gearing 41 may be of any suitable construction for transmitting motion from the motor 42 to a driving shaft 97 which carries a long gear 40. The driven endless screw 32 for operating the pivot 30—31 is suitably journaled in axial alinement with the shaft 97 in a common bearing 98. The other end of screw 32 is supported on the base at 99, Figure 2.

The pivot 30—31 projects through a slot 100 in the base 82 and said slot is widened as at 101 to permit meshing of the gear 40 and clutch gear 39. The screw shaft 35 is mounted is bearings 102, 102 and the closing clutch member 36 is preferably located in a fixed position near the one bearing 102, while the other, opening, clutch member 37 is adapted to be adjusted towards and away from the clutch member 36. A lock nut 103 maintains clutch member 37 in adjusted position. The gears 33 and 34 may be mounted as shown.

The limit switch 29 may be made in a separate unit as shown. Preferably springs 104 may be employed to keep the movable contacts 46 and 48 in contact with the fixed contacts 47 and 49.

The snap switch may also be formed into a unit and thereafter secured to the base. The switch lever 55 is nonconducting and carries a pin 105 kept in contact with the operating arm 53 by the spring 66. The lever contact 56 is carried by the lever 55 and extends to both sides so as to be able to contact with either of the contacts 58 and 59. The lever contact also extends downwardly so as to be in constant sliding contact with the fixed contact 57 shown in dotted lines beneath the lever 55.

From the foregoing it will be clear that this invention provides a simply constructed and highly efficient mechanism for automatically adjusting or operating the supply valves in response to temperature changes in the furnace. It will be noted that adequate provision has been made for adjusting the several connections and pivots. And that, depending upon the local conditions, not only are the valves operated at once when the temperature is changed, but after a predetermined time interval, further automatic operation of the valves is provided for.

Again, that this invention does not depend upon a fixed throw of the valves, but that the latter may be more or less opened and closed from an indefinite number of positions of the valve within the limits required for the local condition.

It should further be understood that changes may be made in the detailed construction and arrangement disclosed without departing from the spirit of the invention and the scope of the appended claims.

I claim:—

1. In combination, a furnace, valves for controlling the fuel supply thereto, an electric circuit including a device responsive to temperature changes in said furnace, a first motor in said circuit, electrical connections included in said circuit for actuating said motor to operate the said valves when the temperature in the furnace varies from a predetermined constant, a second motor in said circuit, a switch operated by said first motor to exclude the latter from the circuit when said valves have been operated and to include the said second motor in said circuit, and means between the second motor and the valves for operating the latter still further after a predetermined variable time internal in the event of insufficient operation of the valves by said first motor.

2. In combination, a furnace, valves for controlling the fuel supply thereto, a lever for operating said valves, a first motor for operating said lever, means for adjusting the extent of said lever operation, a second motor, means between the latter and said lever for operating the lever in addition to its operation by said first motor and means for sequentially operating said motors in response to temperature changes in said furnace with a variable predetermined time interval between the operations of the two motors.

3. In combination, a furnace, valves for controlling the fuel supply thereto, a lever for operating said valves, a first motor for actuating said lever in response to temperature changes within said furnace, a second motor, mechanism operated by the latter for actuating said lever in the event of insufficient operation thereof by said first motor and means in said mechanism for controlling the length of time within which the second motor starts to actuate the said lever as aforesaid.

4. In combination, a furnace, valves for controlling the fuel supply thereto, valve operating means, two motors for actuating the latter, one of said motors being adapted to actuate said valve operating means in substantially immediate response to temperature changes within said furnace, the other motor being adapted to actuate said valve operating means in the event of insufficient operation by the first motor and mechanism for controlling the interval of time between the operations of the said two motors.

5. In combination, a furnace, valves controlling the fuel supply thereto, an electric circuit including a device responsive to temperature changes in said furnace, valve operating means, a first motor, connections in said circuit for starting said motor to actuate said valve operating means in response to temperature changes in the furnace, a second motor, a switch in said circuit, means for operating said switch from said first motor to exclude the first motor from said circuit and to include said second motor in the circuit, mechanism for operating said valve operating means by said second motor after the latter has been included in the circuit and in the event said temperature prevails after said valves have been operated by said first motor, and a second switch in said circuit for preventing further operation of said second motor in the event the valves have been operated to their full closed or full open position.

6. In combination, a furnace, valves for controlling the fuel supply thereto, a first motor for partially opening or closing said valves in response to a decrease or an increase in the temperature in said furnace, a second motor adapted to operate in one direction to still further close said valves in the event the temperature increase prevails after said valves have been partially closed by said first motor, said second motor being also adapted to operate in the reverse direction for partially opening said valves in the event the temperature subsequently decreases and an electric circuit for operating said motors.

7. The combination of a fuel supply control valve, means for operating said valve in response to temperature changes within the furnace which is to be supplied with fuel, and a mechanism, for subsequently operating said valve after a predetermined time interval in response to a further subsequent variation in said temperature.

8. The combination of a fuel supply control valve, means for operating said valve in response to temperature changes within the furnace which is to be supplied with fuel, and a mechanism, for subsequently operating said valve after a predetermined time interval in response to a further subsequent variation in said temperature and means for adjusting the said mechanism.

9. The combination of a fuel supply control valve, means for operating said valve automatically in response to temperature changes within the furnace which is to be supplied with fuel, other means for still further operating said valve in the event of insufficient operation of said valve by said first named valve operating means and mechanism for adjusting said other means to cause the said further operations within a given time interval dependent upon the changes in temeprature resulting from the operation of the said first named valve operating means.

10. The combination of a fuel supply control valve, means for operating said valve in a given direction in response to temperature changes within the furnace which is to be supplied with the fuel, other valve operating means and mechanism for causing the latter to operate said valve still further in said direction within a predetermined given time in the event of insufficient operation of said valve by said first named valve operating means.

11. The combination of a fuel supply control valve, means for operating said valve in response to temperature changes within the furnace which is to be supplied with the fuel, other valve operating means and mechanism for causing the latter to operate said valve still further and within a predetermined given time to an extent determined by said temperature changes in the event of insufficient operation of said valve by said first named valve operation means.

12. The combination of fuel supply control valves, means for operating said valves to a predetermined extent in response to a given temperature change within the furnace to be supplied with the fuel, and mechanism for causing a still further operation of the valves in the same direction in the event said temperature change prevails for a given length of time after said first named operation of the valves, said mechanism also causing still further operations of the valves in the same direction as and when subsequent similar changes in the temperature occur.

13. The combination of fuel supply control valves, means for partially closing or opening said valves in response to a temperature increase or decrease within the furnace which is to be supplied with the fuel, mechanism adapted to close or open said valves still further in the vent of insufficient operation of the said first named closing means, a device actuated by the latter for starting said mechanism in the event said temperature increase or decrease prevails after the said first named closing means have been operated, said device also acting to cause the operation of the said first named closing or opening means in the event the temperature decreases or increases subsequent to the starting of the operation of the said mechanism.

14. The combination of fuel supply control valves, an electric circuit including a first motor for operating said valves in a given direction in response to temperature changes within the furnace, which is to be supplied with the fuel, a second motor for operating the valves further and a switch in said circuit for actively excluding the said first motor from the circuit and for including the said second motor in the circuit to cause said second motor to further operate the said valves within a given time in the event of insufficient operation by the said first motor.

15. The combination of fuel supply control valves, an electric circuit including a first motor for operating said valves to a predetermined extent in response to temperature changes within the furnace, which is to be supplied with the fuel, a second motor for operating the valves still further to an extent determined by said temperature changes, and a switch in said circuit for actively excluding said first motor from the circuit and for including the second motor in the circuit to cause said second motor to operate said valves within a given time in the event of insufficient operation of the valves by said first motor.

16. The combination of fuel supply control valves, an electric circuit including a first motor for opening or closing said valves in response to decrease or increase in the temperature within the furnace, which is to be supplied with the fuel, a second motor, a switch in said circuit to exclude said first motor from the circuit after said motor has operated the valves and for including said second motor in the circuit to operate in one direction to still further close the valves in the event of insufficient operation of the valves by said first motor and to operate said second motor in the reverse direction to open the valves in the event the temperature within the furnace decreases.

17. A valve controlling apparatus comprising fuel supply control valves, an electric circuit including a first motor for operating the same a predetermined amount in response to temperature changes within the furnace, which is to be supplied with the fuel, a second motor, means in said circuit actuated by said first motor for excluding the latter from the circuit after said motor has been operated and for including said second motor in the circuit to operate in one direction to still further close said valve within a given time in the event of a subsequent increase in the said temperature and to operate in the reverse direction to open said valves within a given time in the event of a subsequent decrease in the said temperature.

18. A valve controlling apparatus comprising fuel supply control valves, a lever for operating the same, a first motor for actuating said lever, a second motor for still further actuating said lever to operate said valves after they have been operated by the first motor, independent operating means between each valve and the said lever and an electric circuit operable in response to temperature changes within the furnace which is to be supplied with the fuel for actuating the said motors.

GUSTAV H. JOHANSON.